United States Patent [19]
Quakenbush

[11] 3,822,852
[45] July 9, 1974

[54] COMPOUND SWIVEL STRUCTURE FOR VEHICLE SEAT SUPPORT

[75] Inventor: Howard M. Quakenbush, Monona Village, Wis.

[73] Assignee: Flexsteel Industries, Dubuque, Iowa

[22] Filed: Feb. 23, 1972

[21] Appl. No.: 176,987

[52] U.S. Cl. .................... 248/418, 297/349
[51] Int. Cl. .................... F16m 11/08, A47c 1/02
[58] Field of Search ............ 248/415, 418, 282; 297/349; 108/142

[56] References Cited
UNITED STATES PATENTS

| | | | |
|---|---|---|---|
| 3,186,761 | 6/1965 | Propst | 297/349 |
| 3,191,400 | 6/1965 | Swenson | 297/349 |
| 3,394,964 | 7/1968 | Humphries et al. | 297/349 |
| 3,542,424 | 11/1970 | Bingley | 297/349 |
| 3,708,203 | 1/1973 | Barecki et al. | 248/416 |
| 3,727,873 | 4/1973 | Hill | 297/349 |

Primary Examiner—Marion Parsons, Jr.
Attorney, Agent, or Firm—Alberts, Brezina & Lund

[57] ABSTRACT

Compound swivel structure for supporting seat structures in a vehicle to allow selective positioning of a seat against a side wall, or in a forwardly facing direction or in a rearwardly facing direction, to permit utilization of space for maximum convenience and advantage. An arm is supported on a base for movement about a first vertical axis, a seat support being carried by the arm for movement about a second vertical axis, and locking means including a lock bar pivotal on the arm on a horizontal axis, lock the seat support relative to the arm and the arm relative to the base.

7 Claims, 8 Drawing Figures

INVENTOR
HOWARD M. QUAKENBUSH

BY

*Alberts, Brezina + Lund*
ATTORNEYS

INVENTOR
HOWARD M. QUAKENBUSH

BY

*Alberts, Brezina & Lund*

ATTORNEYS

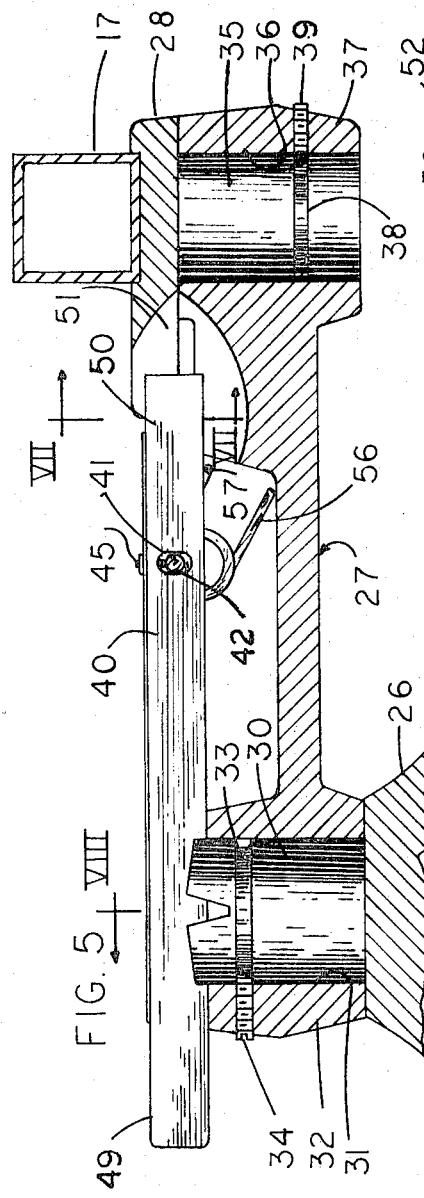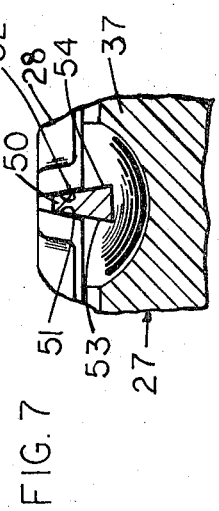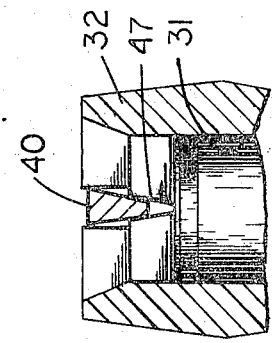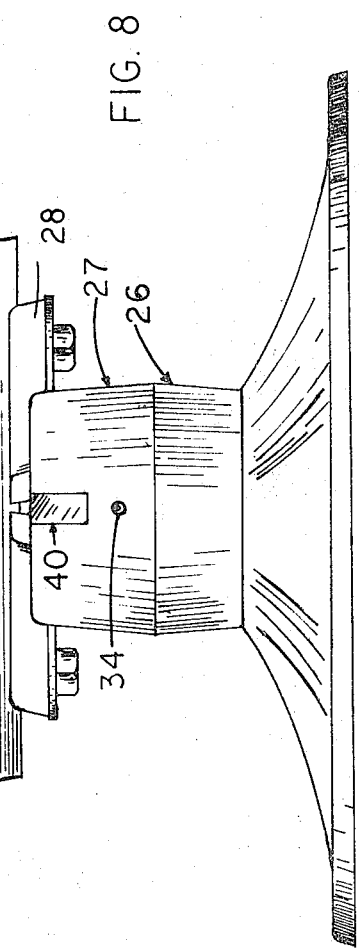

COMPOUND SWIVEL STRUCTURE FOR VEHICLE SEAT SUPPORT

This invention relates to a compound swivel structure and more particularly to a structure for supporting vehicle seats. The structure is simple in construction and operation but is rugged, reliable and safe and allows selective positioning of the seat for optimum and convenient use of space in the vehicle.

The compound swivel structure of this invention has other applications but was especially designed for and is particularly advantageous in the support of seats in vehicles, especially in camper type vehicles in which it is normally desirable to position the seat in a forwardly facing direction for road travel, and in which it is desirable to position the seat in a side-facing direction or a rearwardly facing direction when the vehicle is stopped. Compound swivel structures designed for seat supports are known in the art. For example, the Bingley U.S. Pat. No. 3,542,424 shows a structure designed for a tractor with a rear-mounted backhoe. Such prior art structures are not suitable for use in camper type vehicles and additionally are more complex and not as safe or reliable as would be desirable.

This invention was evolved with the general object of overcoming the disadvantages of prior art structures and of providing a compound swivel structure which is simple in construction and readily operated while being rugged, reliable and safe.

Another object of the invention is to provide a structure which is particularly suitable for combination with a seat structure in a camper-type vehicle.

In accordance with this invention a two axis swivel mechanism is provided in which an arm is mounted on a base for rotation about a first vertical axis and in which a seat carrier or support is mounted on the arm for rotation relative thereto about a second vertical axis. First lock means are provided for locking the arm at any selected one of a plurality of angular positions relative to the base and second lock means are provided for locking the seat support in at least one angular position relative to the arm, with a lock operator for simultaneously operating both lock means.

This mechanism is particularly advantageous in supporting a seat structure in a camper-type vehicle. The base is so located on the floor of the vehicle and the seat so supported on the seat support that the distance between the first and second vertical axes plus the horizontal distance from the second vertical axis to a vertical plane at the back surface of the seat back is equal to the distance from the first vertical axis to a side wall of the vehicle, approximately. Thus, the seat may be located with the back thereof in proximity to the side wall of the vehicle, the lock means being so arranged as to lock the seat in that position. By providing two additional locking positions of the arm relative to the base, it positions spaced 90 degrees clockwise and counterclockwise from the position in which the back is adjacent to the side wall, the seat can be positioned to face forwardly or rearwardly. The use of the two axes of swivel movement, permits placement of the seat in such positions, as desired.

In accordance with important features of the invention, the second lock means are engaged whenever the first lock means are engaged, preferably with the second lock means being engaged prior to the first lock means during actuation of the lock operator toward a lock condition. This arrangement facilitates proper positioning since the seat support can be rotated to find its proper lock position relative to the arm after which the seat support together with the arm are moved together to find the proper lock position of the arm relative to the base.

Additional important features relate to the construction of the locking mechanism. A lock member, preferably an elongated bar, is disposed on the arm to extend along the length thereof and is pivotally mounted thereon for movement about a horizontal axis intermediate the two vertical swivel axes. One end portion of the bar is movable into a slot provided in the seat support. Another portion of the bar is movable selectively into slots of the base. Such slots may preferably be formed in the upper end of an upstanding stud member forming part of the base and the bearing means supporting the arm on the base. Preferably, the slots and the mating portions of the bar have slight tapers to facilitate the positioning and locking operations. The locking mechanism is thus comparatively simple in construction and operation, is economically manufacturable and at the same time is rugged, reliable and safe, which is especially important in supporting seats in vehicles.

This invention comtemplates other objects, features and advantages which will become more fully apparent from the following detailed description taken in conjunction with the accompanying drawings which illustrate a preferred embodiment and in which:

FIG. 5 is a section 1 view taken substantially along line V—V of FIG. 4;

FIG. 6 is a front elevational view of the swivel mechanism;

FIG. 7 is a sectional view taken substantially along line VII—VII of FIG. 5; and FIG. 8 is a sectional view taken substantially along line VIII—VIII of FIG. 5.

Figure 1:
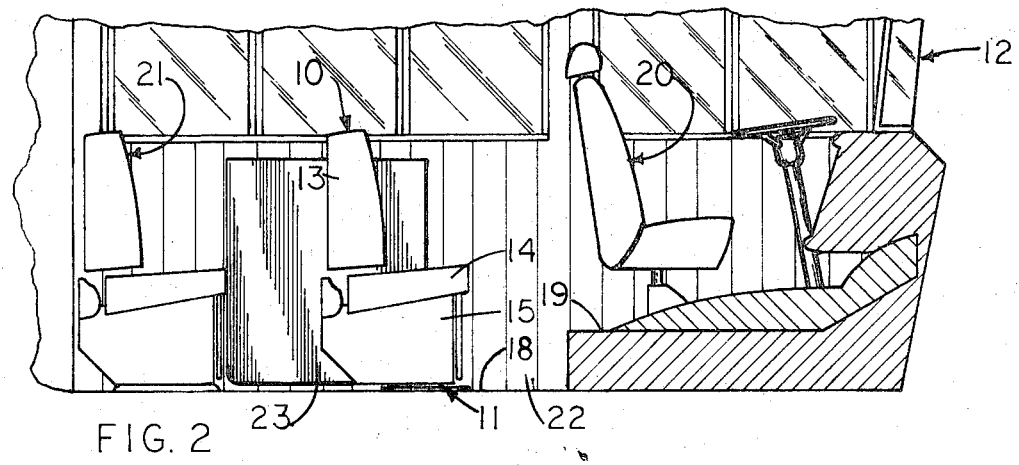
FIG. 1 is a cross-sectional view of a vehicle incorporating a seat supported by a two-axis swivel mechanism, according to the invention, the seat being shown in a forwardly facing position.

Reference Numeral 10 generally designates a seat unit which is shown supported by a two axis swivel mechanism 11 in a vehicle 12, in accordance with the principles of this invention. The seat unit 11 includes a back portion 13, a seat portion 14 and a pair of horizontally spaced vertical wall members 15 and 16, below the seat portion 14, which are supported at opposite ends of a horizontal frame member 17 which is supported from a floor 18 of the vehicle by the swivel mechanism 11.

The mechanism 11 is arranged for selective locking of the seat unit 10 in three positions. In the position shown in FIG. 1, the seat unit 10 faces forwardly which is the normal position when the vehicle is in motion. The seat unit is then positioned rearwardly from an elevated portion 19 of the floor of the vehicle 12 on which a driver's seat unit 20 is mounted, the spacing between the seat unit 10 and the elevated floor portion 19 being such as to provide sufficient leg room. In the position of FIG. 1, the seat unit 10 is also positioned forwardly from a rear seat unit 21 which may be in a fixed position, the distance being such as to provide sufficient leg room for the occupant or occupants of the rear seat unit 21.

Figure 2:
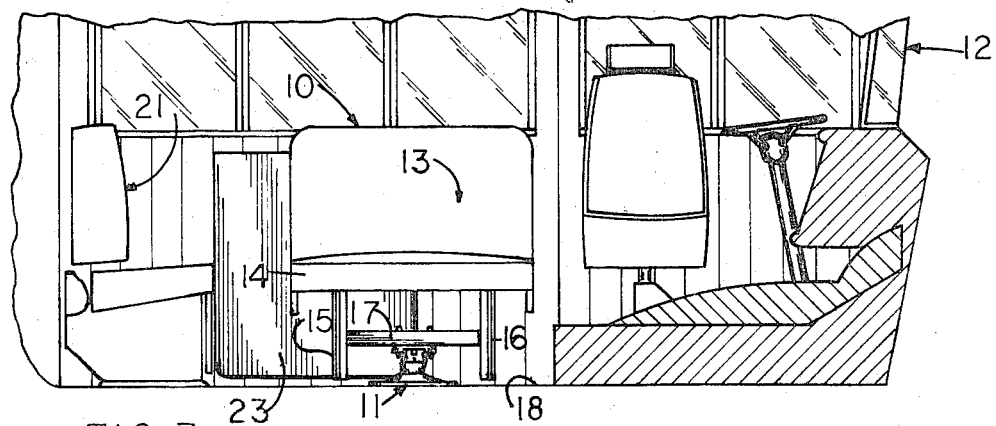
FIG. 2 is a view similar to FIG. 1 but illustrating the seat in a sidewardly facing position.

In the position of FIG. 2, the seat unit 10 faces to the side, the back portion 13 being in proximity to a side wall 22 of the vehicle 12.

Figure 3:
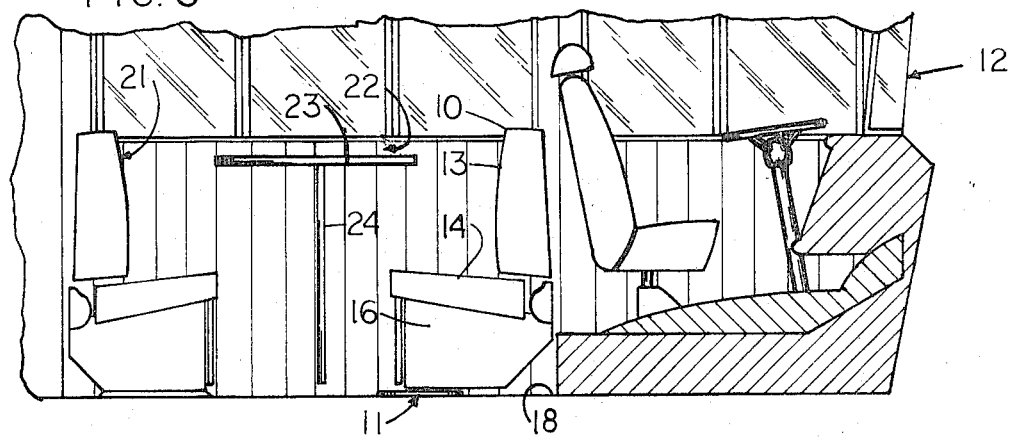
FIG. 3 is a view similar to FIGS. 2 and 3 but illustrating the seat in the rearwardly facing position.
Figure 4:
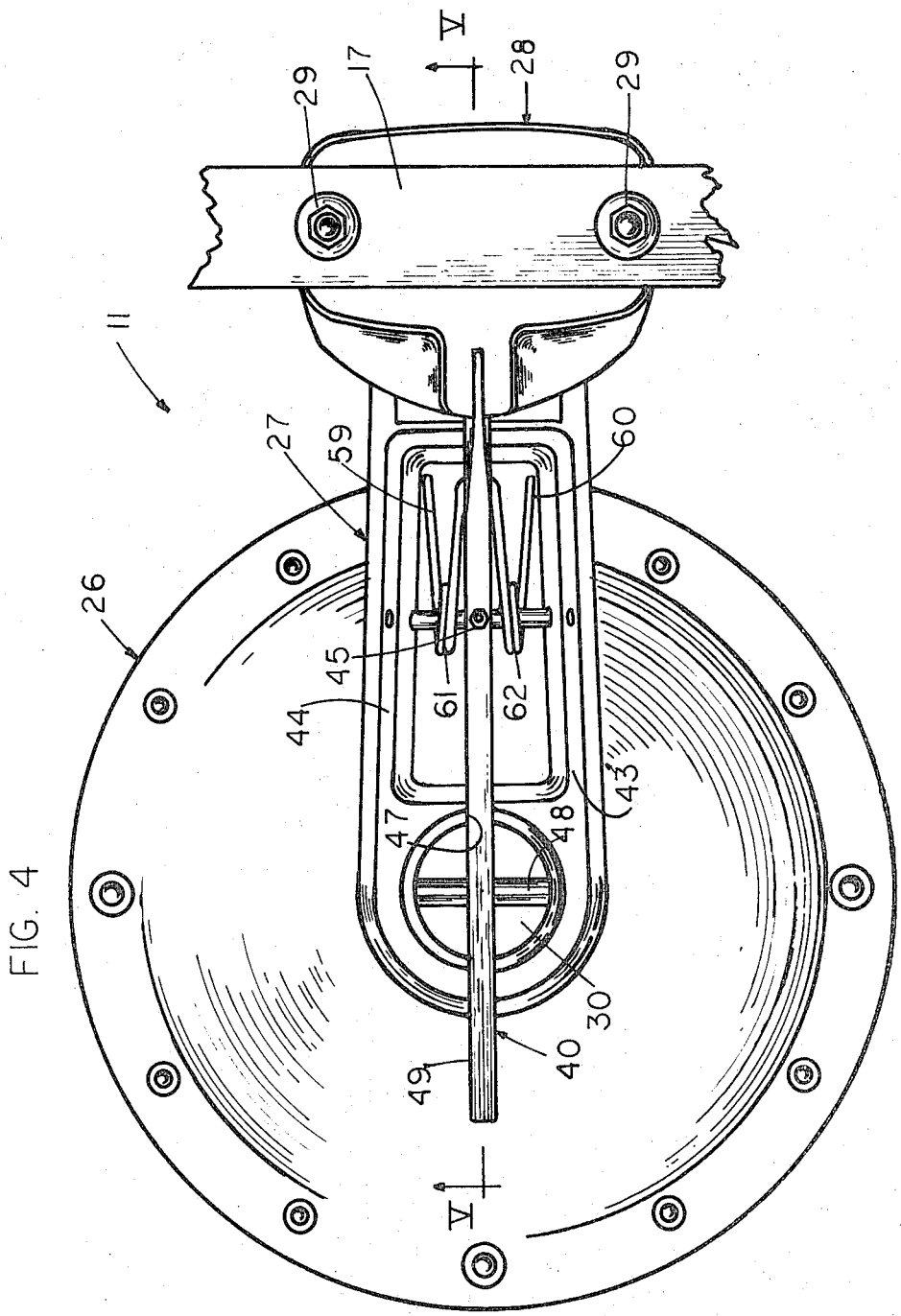
FIG. 4 is a top plan view above the two-axis swivel mechanism of this invention.

In the position shown in FIG. 3, the seat unit 10 faces rearwardly, the back portion 13 being at approximately the plane of the rear edge of the elevated floor portion 19, with a substantial distance between the seat unit 10 and the rear seat unit 21. In this position, a table 23, hinged at one side to the side wall 22, may be lifted up to a horizontal position to be supported by a support post 24. It is also noted that the construction of the seat units 10 and 21 may be such that the seat portions, in the position of FIG. 3, may be moved rearwardly and forwardly to meet at a mid position and the back portions may be folded forwardly and backwardly, to provide a bed. It is also noted that the driver's seat 20 may be pivotally mounted, either to face forwardly for operation of the steering wheel 25 and other controls of the vehicle, or to face sidewardly, as shown in FIG. 2, when the vehicle is stopped.

In referring now to FIGS. 4–8, the swivel mechanism 11 comprises a base 26 arranged to be bolted to the vehicle floor 18, an arm 27 having one end journalled on the base 26 for swivel movement about a first vertical axis and a seat support member 28, secured to the horizontal frame member 17 by bolts 29 and journalled on the opposite end of the arm 27 for swivel movement about a second vertical axis spaced from the first vertical axis. The base 11 is so positioned on the floor 18 that the distance from the first vertical axis to the side wall 22 is equal to or slightly larger than the distance between the first and second vertical axes plus the distance from the second vertical axis to the rearward edge of the seat unit 10. The positioning of the first vertical axis is also such as to provide proper leg room for the occupants of both seat units 10 and 21 when the seat unit 10 is positioned to face forwardly as shown in FIG. 1, as well as to provide proper positioning for use with the seat unit 10 facing rearwardly as shown in FIG. 3. With the two-axis swivel arrangement, the seat unit 10 can be readily moved from one to another of the three positions shown in FIGS. 1, 2 and 3.

To journal the one end of the arm 27 on the base 26, an upstanding stud member 30 is welded or otherwise rigidly secured to the base 26 and defines an external cylindrical bearing surface engaged with an internal cylindrical surface 31 in an integral end portion 32 of the arm 27. The stud member 30 is formed with an annular groove 33 which receives the end of a screw 34 threaded through the wall of the portion 32, to retain the arm on the base 26, while permitting the swivel movement. To support the member 28 on the opposite end of the arm 27, a stud member 35 is welded or otherwise secured thereto, in depending relation, and defines an external cylindrical surface engaged in bearing relationship with an internal cylindrical surface 36 in an opposite end portion 37 of the arm 27. The stud member 35 is formed with an annular groove 38 which receives the end of a screw 39 threaded through the wall of the portion 37, to retain the member 28 on the arm 27 while permitting the swivel movement.

According to an important feature of the invention, first and second lock means are provided for locking the arm 27 and the member 28 in selected positions relative to the base 26 and the arm, respectively. In the illustrated arrangement, the arm 27 is positionable in the three positions required for positioning of the seat unit 10 in the positions of FIGS. 1, 2 and 3, and could also be positioned to have the seat unit 10 facing sidewardly, in a direction opposite the direction illustrated in FIG. 2, there being thus four possible positions in 90 degree relationship. In the illustrated arrangement, the member 28, when locked relative to the arm 27 is always at the same position relative thereto, with the forward face of the frame member 17 facing the first vertical axis, i.e., the axis of swivel movement of the arm 27 on the base 26. This is desirable in the illustrated application of use of the swivel mechanism, but it will be understood that in other applications the additional locked positions of the seat support relative to the arm 27 might be provided.

In accordance with this invention, common lock operator means are provided for both locking means, including a lock member in the form of a bar 40 which is supported on the arm 27 for pivotal movement about a horizontal axis intermediate the first and second vertical axes of the mechanism. In particular, the bar 40 has an opening 41 which receives a horizontal pin 42 extending between spaced vertical wall portions 43 and 44 of the arm 27. Preferably, the opening 41 is in the form of a vertically extending slot, and an adjustment screw 45 is threaded through the bar 40 to engage the portion of the pin 42 within the slot 41, for the purpose of permitting precise adjustment of the position of the bar 40 relative to the axis of the pin 42. This is highly desirable for reasons explained hereinafter.

To lock the arm 27 relative to the base 26, a portion of the lock bar 40 is movable into slots formed in the upper end of the stud member 30, there being two slots 47 and 48 in the illustrated arrangement, at right angles to each other and intersecting at the axis of the stud member 30. An end portion 49 of the bar 40 projects beyond the end of the arm 27, which may be manually lifted to move the bar 40 upwardly out of the slot 47 or the slot 48 and to permit rotation of the arm 27 relative to the base 26.

An opposite end portion 50 of the bar 40 is engagable in a slot 51, formed in the member 28, to lock the member 28 relative to the arm 27. With upward movement of the end portion 49 and clockwise rotation of the bar 40, as viewed in FIG. 5, the end portion 50 moves downwardly out of the slot 51, to allow free pivotal movement of the seat support member 28 relative to the arm 27.

Preferably, and in accordance with a specific feature of the invention, the slots 47 and 48 are tapered, the opposite surfaces of each slot converging from top to bottom, and opposite faces 53 and 54 of the portion of the bar 40 which engages in the slots 47 or 48, are similarly tapered. Also, the opposite surfaces of the slot 51 are tapered, being convergent from the bottom to the top, and the opposite surfaces of the end portion 50 are similarly tapered. With such tapering of the slots and the engaging portions of the bar 40, seating of the bar 40 in the slots is facilitated and exact positioning of the arm 27 relative to the base 26 or of the member 28 relative to the arm 27 is not required for initiation of the locking movement of the bar 40. Preferably, the degree of taper of each slot surface or engaging surface of the bar 40 is on the order of from 5° to 10°, which allows ready positioning while at the same time insuring secure and safe locking engagement.

Through the use of the lock bar 40, both locking means are engaged simultaneously and preferably, the pivotal axis of the lock bar 40 is so located that the locking of the arm 27 relative to the base 26 occurs after locking of the member 28 relative to the arm 27 during actuation of the bar 40 toward the lock condition. Thus, the seat is first locked relative to the arm 27 after which the arm 27 is locked relative to the base 26. At no time is the seat pivotal while the arm 27 is locked relative to the base 26. This is desirable both from the standpoint of safety and from the standpoint of facilitating proper positioning for the final locking engagement. The provision of the adjustment screw 45 is important, in this respect, since it permits highly accurate positioning of the lock bar 40 relative to the axis of the pin 41, and problems which might be encountered with variations in manufacturing tolerances are avoided.

In the illustrated arrangement, the axis of pivotal movement of the bar 40 is closer to the end portion 50 than to the end portion 49 so that gravity alone urges the lock bar 40 to the locking position. Preferably, however, a spring member 56 is provided to assist the forces of gravity in urging the lock bar 40 to the locked condition. Spring member 56 has a central portion 57 engaged with the underside of the bar 40 intermediate the pin 41 and the end portion 50, end portions 59 and 60 which engage an upwardly facing surface portion of the arm 27 and coiled portions 61 and 62 between the central portion 57 and the end portions 59 and 60, the coiled portions 61 and 62 being disposed in encircling relation to the pin 41 on opposite sides of the bar 40.

It will be understood that modifications and variations may be effected without departing from the spirit and scope of the novel concepts of this invention.

I claim as my invention:

1. In a support structure for support of a vehicle seat or the like, base means, arm means, first bearing means journalling said arm means on said base means for swivel movement about a first vertical axis, seat support means, second bearing means journalling said seat support means for swivel movement about a second vertical axis spaced from said first vertical axis, first slot means on said base means defining a plurality of slots spaced angularly about and extending radially with respect to said first vertical axis, second slot means on said seat support means defining at least one slot extending radially with respect to said second vertical axis, and a lock member pivotal on said arm means about a generally horizontal axis intermediate said first and second vertical axes for generally vertical movement of a first portion thereof into a selected one of said plurality of said slots of said first slot means and a simultaneous generally vertical movement of a second portion thereof into slot of said second slot means.

2. In a support structure as defined in claim 1, said first portion of said lock member being movable downwardly into locking engagement with said first slot means while said second portion of said lock member is moved upwardly into locking engagement with said second slot means, and said first portion of said lock member being movable upwardly out of locking engagement with said first lock means while said second portion of said lock member is moved downwardly out of locking engagement with said second slot means.

3. In a support structure as defined in claim 2, said lock member having an intermediate position in which said first portion thereof is out of locking relationship to said first slot means while said second portion thereof is in locking relationship to said second slot means.

4. In a support structure as defined in claim 2, said first bearing means comprising upstanding stud means on said base means defining an external cylindrical surface and means on said arm means defining an internal cylindrical surface in bearing relationship to said external cylindrical surface, said first slot means being formed on the upper end of said upstanding stud means.

5. In a support structure as defined in claim 1, said slots of said first slot means being tapered and said first portion of said lock member having a complementary taper.

6. In a support structure as defined in claim 1, said slots of both said first and second slot means being tapered and being both said first and second portions of said lock member having complementary tapers.

7. In a support structure as defined in claim 2, said lock member having an actuating end portion projecting away from said horizontal pivot axis beyond said first vertical axis, said actuating end portions being movable upwardly to move said first and second portions of said lock member out of locking engagement with both said first and second slot means.

* * * * *